United States Patent [19]

James

[11] Patent Number: 5,542,291

[45] Date of Patent: Aug. 6, 1996

[54] MISFIRE DETECTION IN AN INTERNAL COMBUSTION ENGINE USING MODIFIED MEDIAN AVERAGING

[75] Inventor: John V. James, Walled Lake, Mich.

[73] Assignee: Ford Motor Company, Dearborn, Mich.

[21] Appl. No.: 511,426

[22] Filed: Aug. 4, 1995

[51] Int. Cl.$^6$ .............................. G01M 15/00; F02P 5/15
[52] U.S. Cl. ..................... 73/117.3; 73/116; 123/419; 123/436; 364/431.08
[58] Field of Search .................... 73/116, 117.2, 73/117.3; 123/419, 425, 436; 364/431.03, 431.07, 431.08, 431.05

[56] References Cited

U.S. PATENT DOCUMENTS

| | | | |
|---|---|---|---|
| 4,711,212 | 12/1987 | Haraguchi et al. | 123/425 |
| 5,044,195 | 9/1991 | James et al. | 73/117.3 |
| 5,056,360 | 10/1991 | Dosdall et al. | 73/116 |
| 5,095,742 | 3/1992 | James et al. | 73/116 |
| 5,109,695 | 5/1992 | James et al. | 73/117.3 |
| 5,305,635 | 4/1994 | James et al. | 73/116 |
| 5,361,629 | 11/1994 | McCombie | 73/117.3 |
| 5,394,744 | 3/1995 | James et al. | 73/117.3 |

OTHER PUBLICATIONS

Misfire Detection by Evaluating Crankshaft Speed–A Means to Comply with OBDII, by Mark Klenk, Winfried Moser, Werner Mueller & Wolfgang Wimmer, SAE Technical Paper Series, #930399.

Primary Examiner—Richard Chilcot
Assistant Examiner—George M. Dombroske
Attorney, Agent, or Firm—Mark L. Mollon

[57] ABSTRACT

The invention estimates baseline acceleration expected from normal (i.e., non-misfiring) cylinders in an internal combustion engine even when the misfire rate reaches 50%. An offset median value is used to derive an average or gross acceleration value to provide a baseline rather than a true median. The offset median is the next largest value greater than the true median, so that the presence of 50% misfires does not degrade the determination of the baseline.

9 Claims, 5 Drawing Sheets

WIDTH OF WINDOW 5,542,291

MISFIRE DETECTION IN AN INTERNAL COMBUSTION ENGINE USING MODIFIED MEDIAN AVERAGING

BACKGROUND OF THE INVENTION

The present invention relates in general to detecting misfires occurring during normal in-use vehicle operation of internal combustion engines, and more specifically to determining a baseline acceleration value in a manner that permits detection of high misfire rates, such as 50% misfires.

Monitoring of crankshaft acceleration in an internal combustion engine is a preferred technique to detect misfires of individual cylinder firings during engine operation. An advantageous system for crankshaft based misfire detection is described in U.S. Pat. Nos. 5,044,195; 5,056,360; and 5,109,695. This system utilizes the determination of a deviant acceleration, which is the difference between the instantaneous acceleration for an individual cylinder firing and an estimated baseline acceleration. In particular, the baseline acceleration is determined as a median average over a series of cylinder accelerations including the cylinder firing of interest.

The foregoing system achieves acceptable sensitivity at low misfire rates (i.e., provides reliable detection and a low false alarm rate) thereby making crankshaft-based misfire detection feasible. However, the typical method employed for determining a baseline acceleration lacks the ability to detect high misfire rates (specifically 50% of cylinder events being misfires). More specifically, prior averaging methods (including median averaging) are distorted unacceptably by the presence of data from misfires when those misfires comprise 50% of the data within the averaging window.

Although a 50% misfire rate may be a rare occurrence and although such a condition may be immediately apparent from roughness in engine operation, it may nevertheless be desirable to electronically detect such a condition so that it can be recorded and/or corrective action can be taken. Furthermore, for some engines and some types of ignition systems, a 50% misfire rate can result from a single component failure (e.g., a coil failure in a four-cylinder distributorless wasted-spark ignition system using two coils).

SUMMARY OF THE INVENTION

The present invention has the advantage of determining a baseline acceleration value that provides reliable misfire detection at up to 50% misfire rates.

In one aspect, the present invention obtains a baseline acceleration value using a modified median average. By selecting a baseline value as an offset value from the true median value, a better estimate of gross engine acceleration is obtained even if a misfire rate of 50% occurs.

More specifically, the present invention provides a method for determining gross engine acceleration of an N-cylinder internal combustion engine during a time interval including a plurality of cylinder events. Crankshaft acceleration is measured corresponding to each of a plurality of consecutive cylinder events during operation of the engine. A cylinder event is selected corresponding to an instant for which gross engine acceleration is to be determined. The gross engine acceleration is assigned a value substantially equal to an offset median acceleration over a series of the cylinder events including the selected cylinder event. The offset median acceleration differs from the true median value in that the offset median acceleration corresponds to the crankshaft acceleration measurement having a next greater value than the true median value.

DETAILED DESCRIPTION OF PREFERRED EMBODIMENTS

Figure 1:
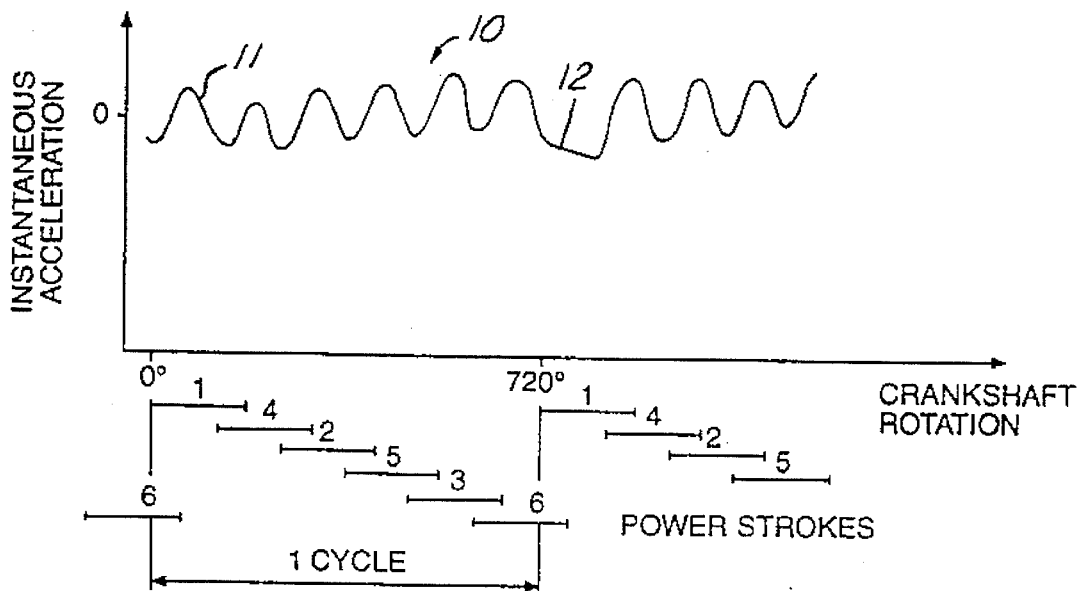
FIG. 1 is a plot showing instantaneous acceleration versus crankshaft rotation for normal and misfiring cylinders.

In the typical four-stroke combustion engine, the four strokes include the intake stroke, the compression stroke, the power stroke, and the exhaust stroke. As shown in FIG. 1, the power strokes of the respective cylinders are arranged in a particular order according to crankshaft position. Furthermore, in any engine having more than four cylinders, the power strokes of different cylinders will overlap. One engine cycle is comprised of 720° of crankshaft rotation during which each cylinder passes through each of its four strokes.

Curve 10 in FIG. 1 shows approximate acceleration fluctuation during engine operation. An acceleration peak 11 occurs during the firing interval of cylinder No. 1 and other maximums in the acceleration curve occur approximately corresponding to each other properly firing cylinder. When a misfire occurs such that no significant power is created by a cylinder during its firing interval, the crankshaft decelerates as indicated at 12.

Figure 2:
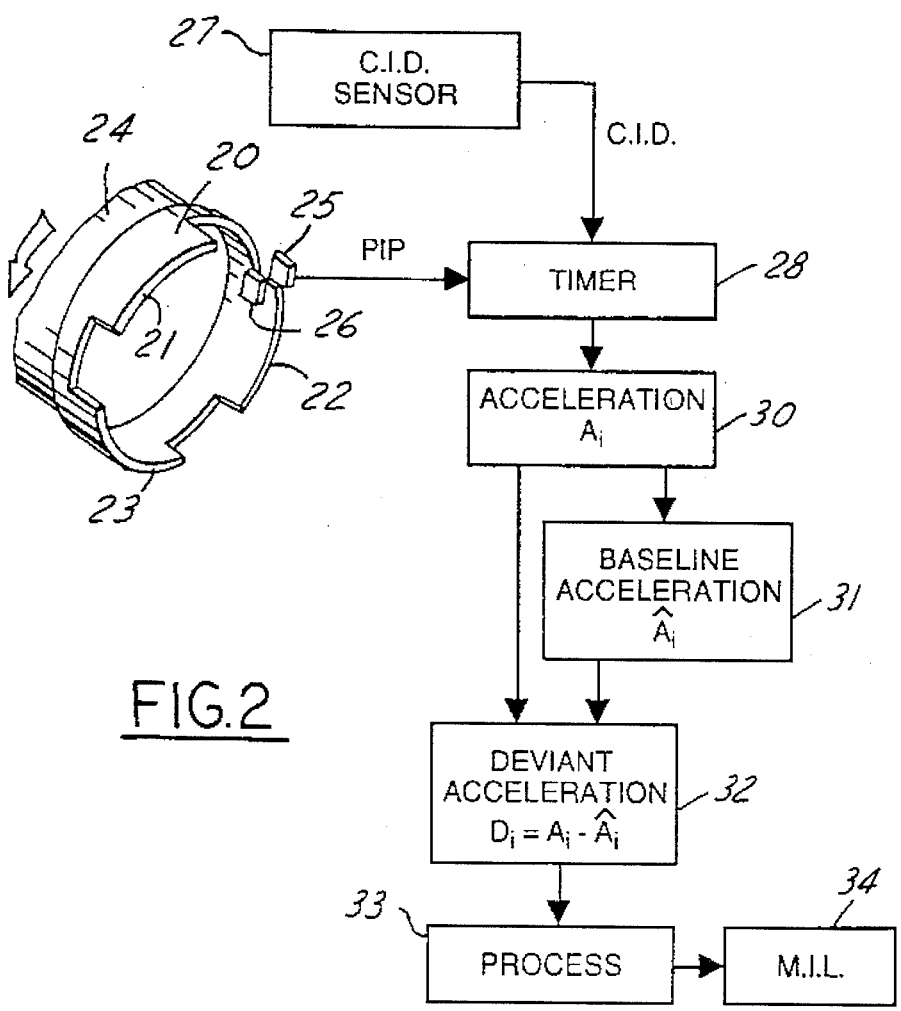
FIG. 2 is a schematic and block diagram showing measuring and calculating apparatus according to the present invention.

FIG. 2 shows apparatus for measuring crankshaft rotation intervals and processing data in order to detect misfires. An engine rotation position sensing system includes a rotor 20 including vanes 21, 22, and 23, which rotate with a crankshaft 24 (a three-vane rotor from a six-cylinder engine is shown in this example while a two-vane rotor may be utilized in a four-cylinder engine). Vanes 21–23 pass between a hall-effect sensor 25 and a permanent magnet 26 to generate a profile ignition pulse (PIP) signal as crankshaft 24 rotates. Vanes 21–23 are arranged to generate a rising edge in the PIP signal at a predetermined position in relation to top dead center of each respective cylinder. The PIP signal actually indicates the approach to top dead center of two engine cylinders, one of which is approaching a power stroke and one of which is approaching an intake stroke since it takes two full crankshaft rotations to complete an engine cycle.

A cylinder identification (CID) sensor 27 is connected to a camshaft (not shown) for identifying which of the two cylinders is actually on its power stroke. The camshaft rotates once for every two rotations of crankshaft 24. The resulting CID signal includes transitions which identify a cylinder approaching its power stroke. A timer 28 receives the PIP signal and the CID signal and measures a lapsed time between predetermined engine position locations as determined by the PIP and CID signals. The elapsed time for each velocity measuring interval i is output from timer 28 to an acceleration determination block 30. A raw acceleration value A(i) is determined based on the elapsed time interval and the known or assumed rotation interval corresponding to interval i.

A baseline acceleration block 31 receives the successive raw acceleration values from block 30. The accumulated raw values are passed through an averaging filter to determine the baseline acceleration $\hat{A}_i$. The raw acceleration and the baseline acceleration are input to a deviant acceleration block 32 which forms the difference of these two values. The resulting deviant acceleration $D_i$ is input to a misfire detection process 33. For example, the deviant acceleration may be scaled by an expected torque corresponding to the instantaneous engine operating conditions in order to form a power loss value. If a misfire condition (e.g., misfires occurring at greater than a predetermined overall rate) is detected then an indication signal is coupled to a misfire indication light (MIL) 34 to signal a driver of the condition.

In a preferred embodiment, timer 28 and blocks 30–33 are implemented as part of a microcontroller with associated memory and software instructions.

Figure 3:
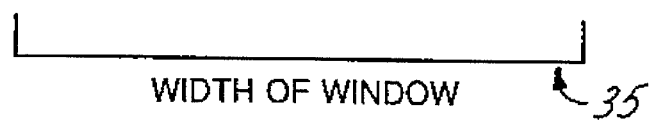
FIG. 3 shows a series of acceleration measurements for consecutive firing intervals of an engine with corresponding notation to denote consecutive cylinder events.

FIG. 3 shows a stream of raw acceleration measurements in relation to a specific time interval i. A sliding window 35, preferably centered on raw acceleration measurement $A_i$, provides input values for an averaging filter to derive baseline acceleration. Thus, the series of accelerations for determining the average acceleration value includes an odd number of consecutive acceleration measurements having the respective acceleration value of interest at the center. With N being the number of cylinders in the internal combustion engine, the number of acceleration measurements within a series for computing an average acceleration (i.e., the width of the sliding window) is preferably at least equal to N−1. For example, in the representative data for a 4-cylinder engine shown in FIGS. 5–16, a window size equal to 5 acceleration samples is used. Nevertheless, other window sizes may also be utilized (even number window sizes can also be used by adapting the median to handle an even number of samples).

According to the prior art, the baseline acceleration value (also known as the gross acceleration value corresponding to the interval of interest) is determined by forming a median average. In other words, the raw acceleration values in the sliding window are arranged in order according to their values and the value at the center of the ordered series is taken as the average. Thus, the window contains the same number of values greater than the median as it does the number of values less than the median.

Figure 4:
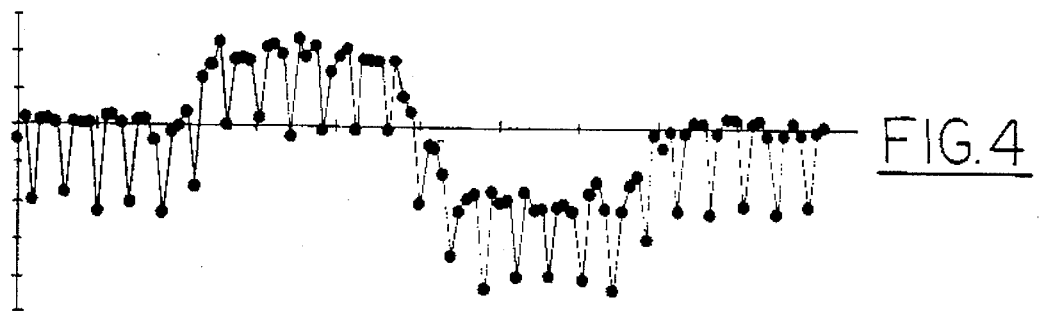
FIG. 4 is a plot representing raw acceleration data with an introduced misfire rate of 25% (or 1-in-4 cylinders).
Figure 5:
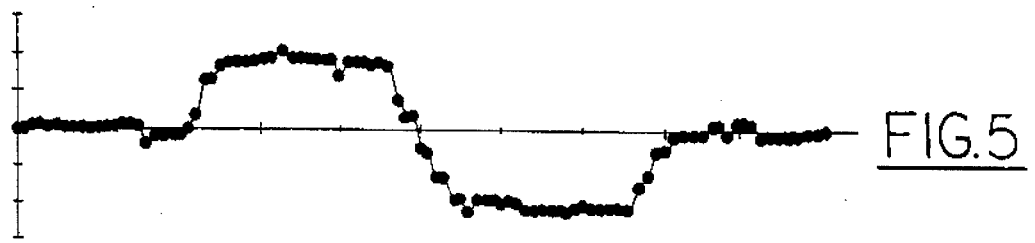
FIG. 5 is a plot representing median-filtered acceleration derived from FIG. 4.
Figure 6:
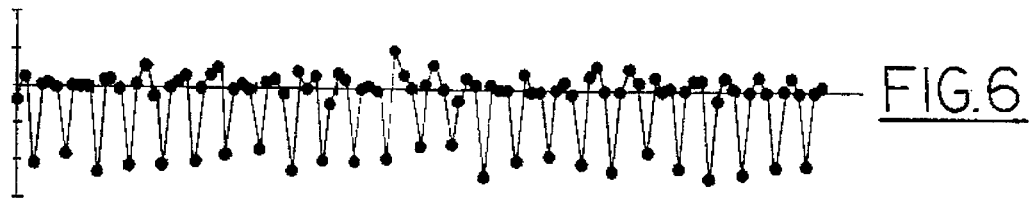
FIG. 6 is a plot representing deviant acceleration obtained as the difference between data values from FIGS. 4 and 5.

Performance of a misfire detector using the foregoing median-filter (having a median width of 5) is shown in FIGS. 4–9. FIG. 4 plots raw acceleration values in a 4-cylinder engine with one of the four cylinders repeatedly misfiring. In addition, the engine is operating with a fluctuating baseline acceleration due to changes in operating conditions or external loads. FIG. 5 shows the results of median averaging of the data shown in FIG. 4 using a sliding window and using the true median value within each sliding window. Thus, FIG. 5 shows a baseline acceleration showing the gross acceleration of the engine with the effects of misfire removed. Forming the difference between the data of FIGS. 4 and 5 produces a deviant acceleration as shown in FIG. 6 which highlights the effect of misfire. With the data from FIG. 6, it becomes possible to identify misfires by comparison with a threshold, especially after further processing such as to form power loss values as described in the previously cited patents.

Figure 7:
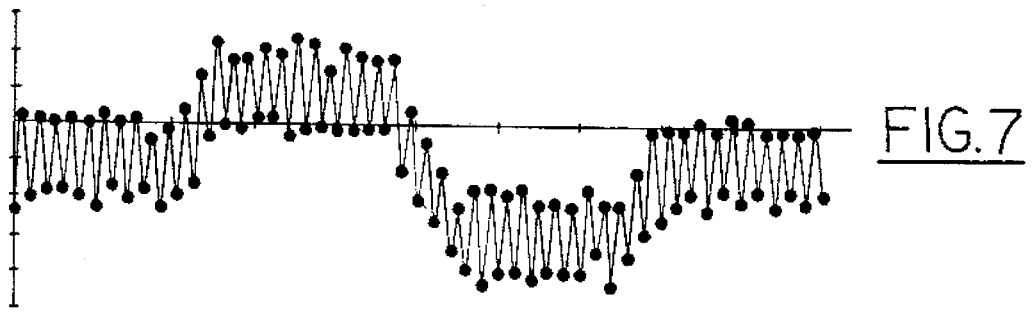
FIG. 7 is a plot representing raw acceleration data during misfires at a rate of 50% (or 2-in-4 cylinders).
Figure 8:
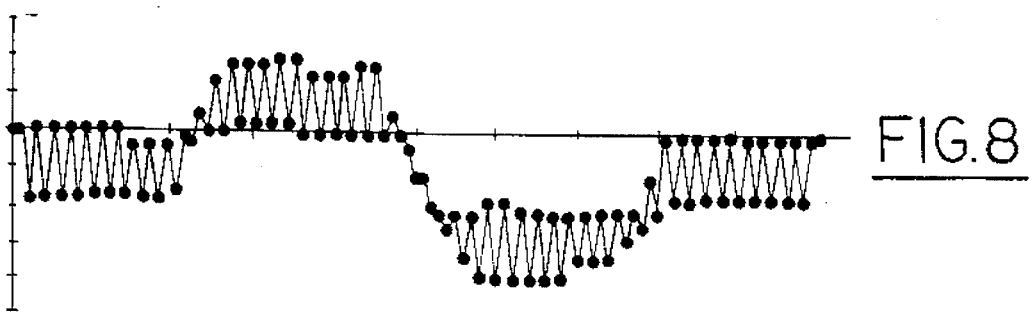
FIG. 8 is a plot representing median-filtered acceleration derived from FIG. 7.
Figure 9:
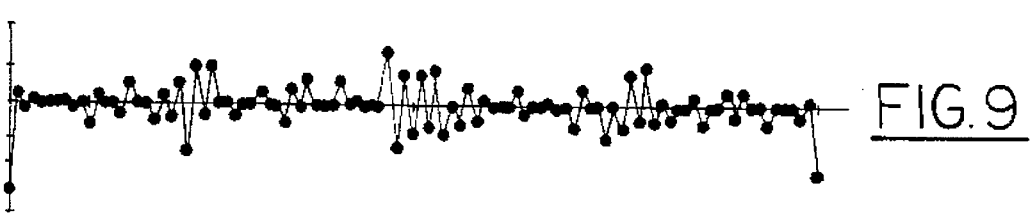
FIG. 9 is a plot representing deviant acceleration obtained as the difference between data values from FIGS. 7 and 8.

FIG. 7 shows raw acceleration values for a 4-cylinder engine but with a misfire rate of 50% wherein two cylinders of the four cylinder engine are disabled causing misfire on every other cylinder firing. FIG. 8 shows the median-filtered values derived from FIG. 7. It can be seen that at this 50% misfire rate with alternating cylinders misfiring, the true median-filtered data fails to establish an accurate baseline of gross engine acceleration. The deviant acceleration shown in FIG. 9 fails to highlight the misfire information and shows that detection of misfire is unreliable at 50% misfire rates using the true median-filtered acceleration data.

The true median average for determining baseline acceleration performs well at misfire rates less than 50% because the median remains virtually unaffected by the presence of misfires until they account for half of all firings, at which point the performance fails. Other types of averages (such as an arithmetic mean) also suffer from the inclusion of misfire in the average, but in the case of arithmetic mean, the degradation in performance begins at much lower levels of misfire and gradually worsens with increasing misfire rate.

Figure 10:
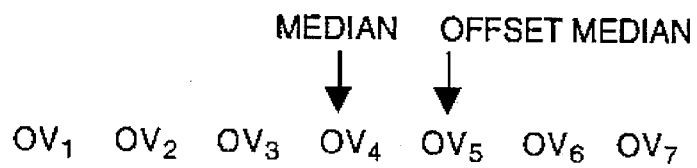
FIG. 10 shows an ordered series of acceleration values for defining a median and an offset median.

The present invention utilizes a modified form of the median filter that is substantially unaffected by the 50% misfire rate. In this invention, the true median is replaced with an offset median. In other words, after sorting the raw acceleration measurements in a window according to value, instead of choosing the median value for the filter output, a greater value (preferably the next highest value) is used instead. Thus, as shown in FIG. 10, raw acceleration measurements from a sliding window having a width of seven are sorted in order from ordered value No. 1 ($OV_1$) through ordered value No. 7 ($OV_7$). In this ordered series, the median value corresponds to value $OV_4$. With the measurements ordered by increasing value from $OV_1$ to $OV_7$, the offset median value is selected with a higher value than the true median $OV_4$. Preferably, the next highest value $OV_5$ is selected as the offset median. Technically, the modified median filter used in this invention is no longer a median at all. Rather, a non-median value is used that is obtained through a minor modification to any algorithm which implements a median function.

Figure 11:
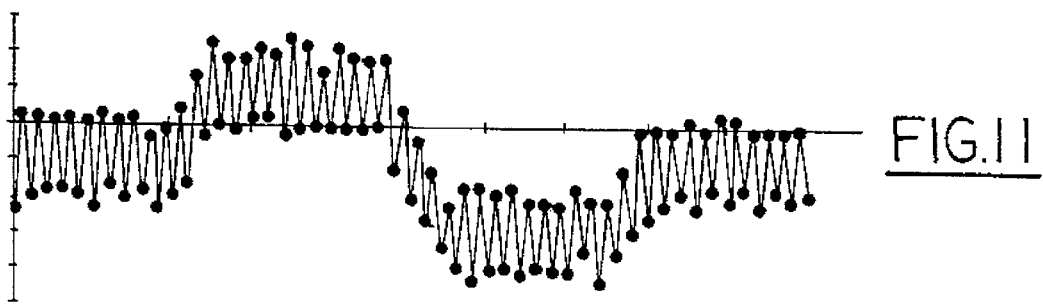
FIG. 11 is a plot representing raw acceleration data during a misfire rate of 50% and is identical to FIG. 7.
Figure 12:
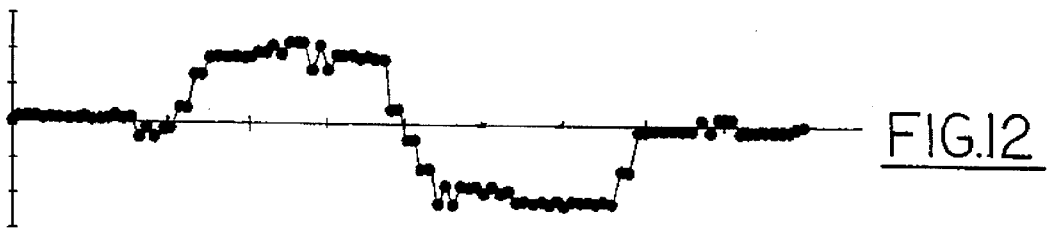
FIG. 12 is a plot representing offset median-filtered values derived from FIG. 11.
Figure 13:
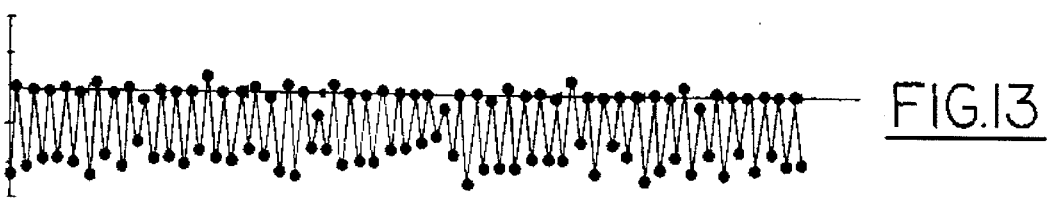
FIG. 13 is a plot representing deviant acceleration obtained using the offset median-filtered values of FIG. 12 as a baseline.

The improved performance of the present invention is shown at a 50% misfire rate in FIGS. 11–13. FIG. 11 shows raw acceleration values at a 50% misfire rate. FIG. 12 shows the offset median-filtered baseline acceleration. By using the offset median technique, the baseline acceleration in FIG. 12 is restored to proper performance. Thus, the deviant acceleration shown in FIG. 13 again highlights the occurrences of misfire.

Figure 14:
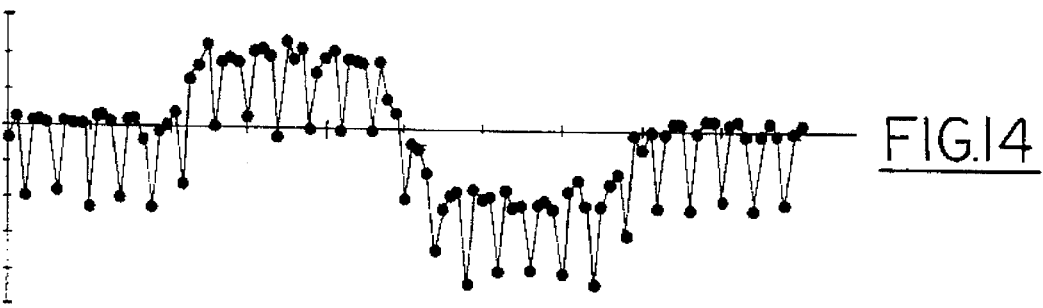
FIG. 14 is a plot representing raw acceleration data during a misfire rate of 25% (or 1-in-4 cylinders) and is identical to FIG. 4.
Figure 15:
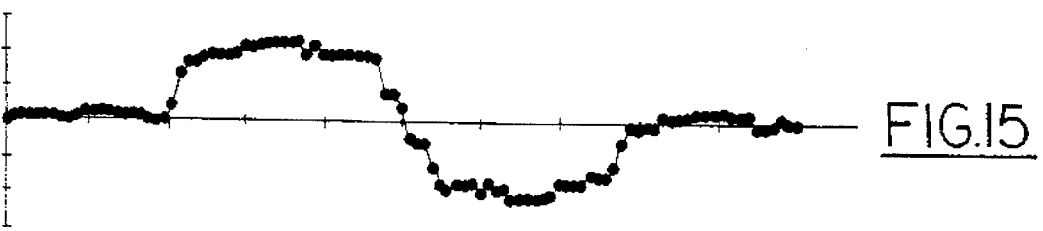
FIG. 15 is a plot representing offset median-filtered acceleration values derived from FIG. 14.
Figure 16:
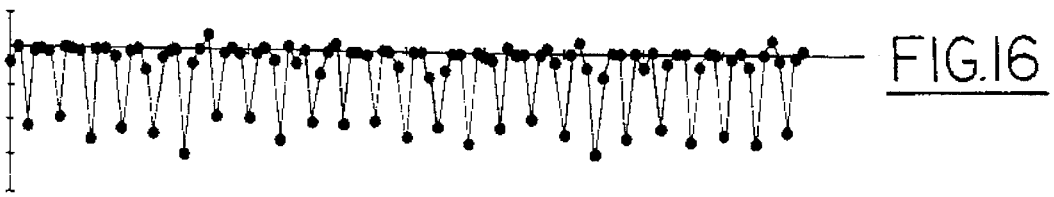
FIG. 16 is a plot representing deviant acceleration obtained as the difference between data values from FIGS. 14 and 15.

FIGS. 14–16 illustrate that the use of the offset median also performs properly at less than 50% misfire rates. FIG. 14 shows raw acceleration data with a 1-in-4 (25%) misfire rate. FIGS. 15 and 16 show baseline acceleration and deviant acceleration comparable to the true median filter data of FIGS. 5 and 6.

Figure 17:
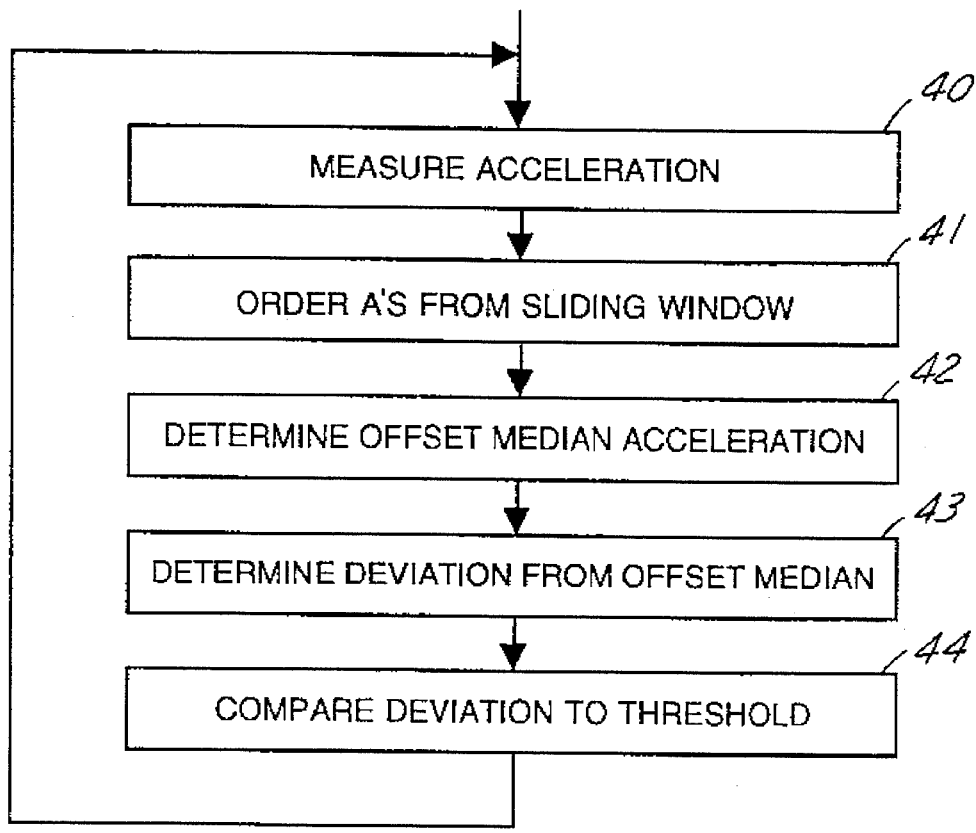
FIG. 17 is a flowchart showing a generalized method of the present invention.

The preferred method of the present invention is shown in FIG. 17. In step 40, raw acceleration values are measured. The raw acceleration values from a sliding window are ordered by magnitude in step 41. The offset median acceleration is determined in step 42 in order to then determine a deviation acceleration according to the baseline determined using the offset median in step 43. In step 44, the deviation acceleration is compared to a threshold (preferably after further processing according to other measured engine parameters), with the result of the comparison identifying either a proper firing, a misfire, or a "no-test" condition as described in the earlier cited patents. As a result of using the offset median, misfire rates of up to and including 50% are reliably detected.

The use of an offset median results in a baseline acceleration estimate that is slightly higher than the true median estimate. This causes the resulting deviant acceleration values to be slightly lower (more negative). In the vast majority of circumstances, this lowering of deviant acceleration has no significant impact. However, there is a potential to lower the estimated noise which is based on the random excursions of deviant acceleration in the positive direction, as described in previously mentioned U.S. Pat. No. 5,109,695. This lowering of estimated noise can be compensated by adjusting the "no-test" threshold. The lowering of deviant acceleration values might also increase the likelihood of false alarms (by allowing noisy values to drop below the misfire detection threshold), but this would usually be a very slight change from the result obtained with the true median. The use of the offset median may also cause brief drops in deviant acceleration during sudden acceleration transients that would not be present using a true median value. However, for a significant drop in deviant acceleration, very large acceleration transients would be required, so that a significant drop would occur rarely, if ever.

Nevertheless, it may be advisable because of these considerations to utilize the offset median only on a temporary basis during the onset of misfire while using the true median under the vast majority of circumstances. Thus, if a permanent change from the true median to the offset median would produce noticeable side effects, the offset could be turned on and off dynamically during misfire detection. A default offset of zero for determining the median yields a true median value and is used most of the time; it is set to one (or other positive value) only for a predetermined duration after each detected misfire in this alternative embodiment of the invention. Since the first misfire to occur upon the onset of a 50% misfire failure rate is detected by the standard detection scheme with a true median, a shift to using the offset median thereafter would allow misfire detection at 50% or lower rates. To guard against the eventuality that a 50% misfire rate begins during a period of no-test, the no-test criteria also is preferably used to initiate the use of the offset median.

Figure 18:
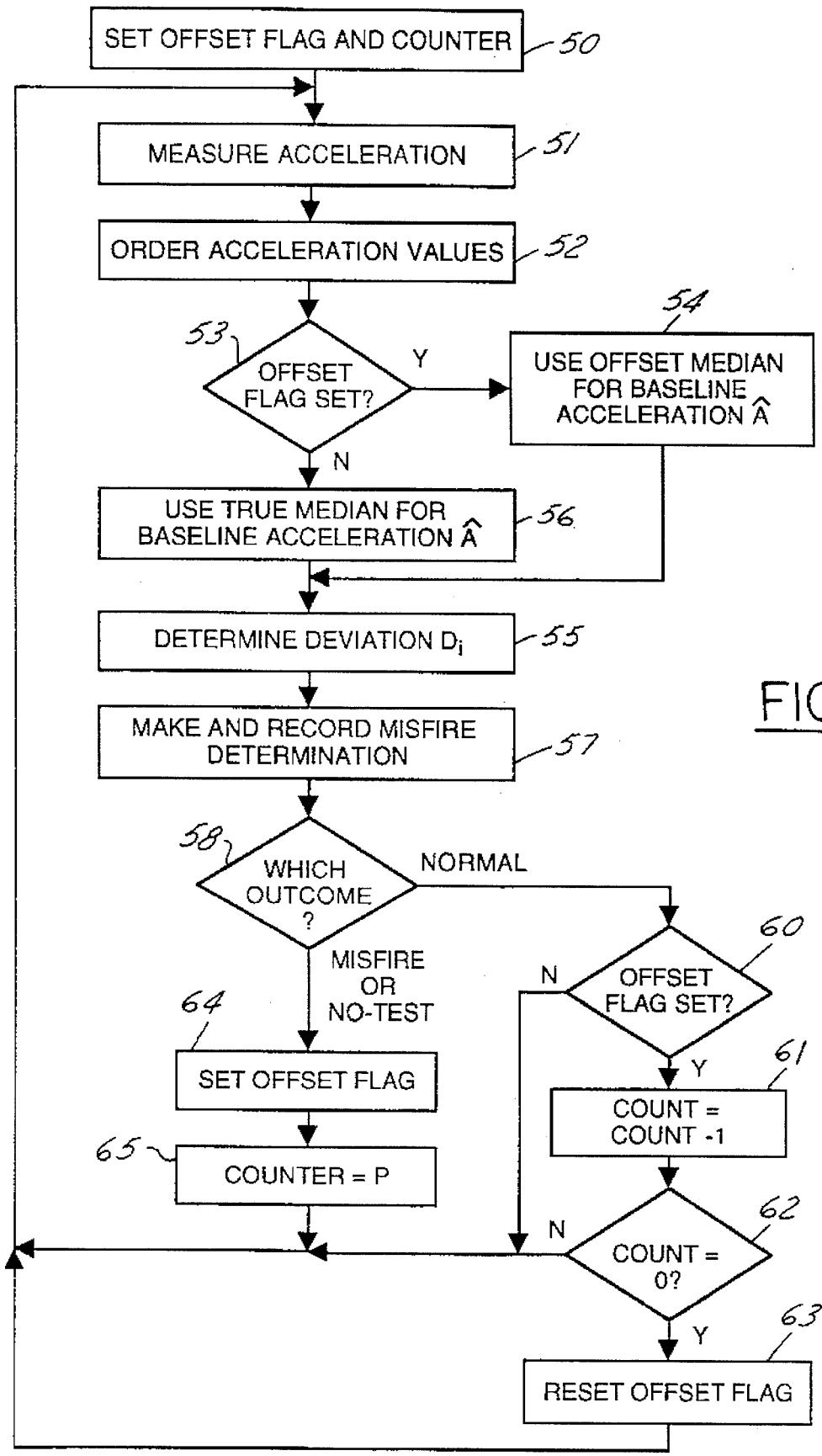
FIG. 18 is a flowchart showing another embodiment of a method according to the present invention.

This alternative embodiment is shown in greater detail in FIG. 18. Upon initiation of the misfire detection method, an offset flag and event counter are set in step 50. Raw acceleration values are measured in step 51 and the raw values within a sliding window are ordered according to their magnitudes in step 52. In step 53, a check is made to determine whether the offset flag is set. If the offset flag is set, then the offset median is used to determine baseline acceleration in step 54. Then deviation acceleration $D_i$ is determined in step 55. If, on the other hand, the offset flag was determined to not be set in step 53, the true median value is used for determining baseline acceleration in step 56 and the deviation acceleration $D_i$ is determined in step 55 on the basis of the true median. Based on the deviation acceleration, a misfire determination is made and recorded in step 57.

In step 58, a check is made to determine whether the misfire determination corresponded to either a misfire or a no-test condition (i.e., did not correspond to a proper firing). If neither of these conditions is present, then a check is made in step 60 to determine whether the offset flag is set. If it is not set, then a return is made to step 51 for measuring another raw acceleration value. If the offset flag is set, then the counter is decremented by one in step 61. In step 62, a check is made to determine whether the delay equals zero. If not then a return is made to measure raw acceleration in step 51. If the counter has been decremented to zero, then the offset flag is reset in step 63 and a return is made to step 51.

If the check in step 58 determines that the misfire determination was a misfire or a no-test condition, then the offset flag is set in step 64 and the event counter is set to a predetermined value P in step 65. Then a return is made to step 51.

By using the method shown in FIG. 18, an offset median is used to determine baseline acceleration upon start-up of the misfire detector, and upon the occurrence of either a misfire or a no-test condition thereafter. The offset median continues to be used for a predetermined number of misfire determinations P. The value of P preferably corresponds to about one engine cycle. When P consecutive number of normal firings have been detected, then the method reverts to use of the true median for determining the baseline acceleration, at least until the next detection of a misfire or a no-test condition.

Rather than dynamically changing the offset as in FIG. 18, another alternative embodiment uses the offset median in a dedicated "50% misfire detector" running concurrently with a "normal misfire detector" using the true median. In yet another alternative embodiment, the use of an offset median could be triggered based on the particular distribution of data about the true median (e.g., an analysis of the magnitude differences) but this requires extra computational capacities.

What is claimed is:

1. A method for determining gross engine acceleration of an N-cylinder internal combustion engine during a time interval including a plurality of cylinder events, said method comprising the steps of:

measuring crankshaft acceleration corresponding to each of a plurality of consecutive cylinder events during operation of said engine;

selecting a cylinder event corresponding to an instant for which gross engine acceleration is to be determined; and assigning said gross engine acceleration a value substantially equal to an offset median acceleration over a series of said cylinder events including said selected cylinder event, said series having a true median value, said offset median acceleration corresponding to a crankshaft acceleration measurement having a next greater value than said true median value.

2. The method of claim 1 wherein said offset median is determined by a method comprising the steps of:

ordering all of said crankshaft acceleration measurements in said series by value; and selecting a crankshaft acceleration measurement adjacent to a median of said ordered measurements.

3. A method of detecting misfires of individual cylinder events in a combustion engine, said method comprising the steps of:

measuring engine acceleration corresponding to each of a plurality of cylinder events during operation of said engine;

selecting one of said cylinder events for misfire detection;

determining an offset median acceleration over a series of said cylinder events including said selected cylinder event;

determining a deviation of acceleration of said selected cylinder event from said offset median acceleration; and detecting a misfire of said selected cylinder event in response to said deviation of acceleration.

4. The method of claim 3 wherein said offset median acceleration is determined by a method comprising the steps of:

ordering all of said engine acceleration measurements in said series by value; and selecting an engine acceleration measurement adjacent to a median of said ordered measurements.

5. The method of claim 4 wherein said adjacent measurement is greater than said median.

6. A method of detecting misfires of individual cylinder events in a combustion engine, said method comprising the steps of:

measuring engine acceleration corresponding to each of a plurality of cylinder events during operation of said engine;

selecting one of said cylinder events for misfire detection;

determining a baseline acceleration over a series of said cylinder events including said selected cylinder event;

determining a deviation of acceleration of said selected cylinder event from said baseline acceleration; and detecting a misfire of said selected cylinder event in response to said deviation of acceleration;

wherein said baseline acceleration is determined using a median acceleration over said series of said cylinder events until a misfire is detected, and wherein said baseline acceleration is determined using an offset median over said series of said cylinder events immediately after said misfire is detected.

7. The method of claim 6 wherein said offset median continues to be used until a predetermined number of consecutive cylinder events are determined not to be misfires.

8. The method of claim 6 wherein a no-test condition is detected in response to predetermined criteria, and wherein said baseline acceleration is determined using said offset median immediately after said no-test condition is detected.

9. Apparatus for detecting misfires occurring during individual cylinder events of a multi-cylinder combustion engine, comprising:

a crankshaft rotation sensor;

a processor measuring engine acceleration corresponding to each of a plurality of cylinder events during operation of said engine, selecting one of said cylinder events for misfire detection, determining an offset median acceleration over a series of said cylinder events including said selected cylinder event, determining a deviation of acceleration of said selected cylinder event from said offset median acceleration, and detecting a misfire of said selected cylinder event in response to said deviation of acceleration; and an indicator for displaying an indication of malfunction when misfires are detected at a predetermined rate.

* * * * *